US011552985B2

United States Patent
Garcia Duran et al.

(10) Patent No.: US 11,552,985 B2
(45) Date of Patent: Jan. 10, 2023

(54) METHOD FOR PREDICTING EVENTS USING A JOINT REPRESENTATION OF DIFFERENT FEATURE TYPES

(71) Applicant: NEC Laboratories Europe GmbH, Heidelberg (DE)

(72) Inventors: Alberto Garcia Duran, Madrid (ES); Mathias Niepert, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 681 days.

(21) Appl. No.: 16/480,318

(22) PCT Filed: Dec. 1, 2017

(86) PCT No.: PCT/EP2017/081257
§ 371 (c)(1),
(2) Date: Jul. 24, 2019

(87) PCT Pub. No.: WO2018/149530
PCT Pub. Date: Aug. 23, 2018

(65) Prior Publication Data
US 2019/0379692 A1    Dec. 12, 2019

(30) Foreign Application Priority Data
Feb. 17, 2017    (EP) .................................... 17156689

(51) Int. Cl.
*G06N 3/08*    (2006.01)
*H04L 67/50*   (2022.01)
*H04L 9/40*    (2022.01)

(52) U.S. Cl.
CPC .......... *H04L 63/1441* (2013.01); *G06N 3/08* (2013.01); *H04L 67/535* (2022.05); *H04L 2463/146* (2013.01)

(58) Field of Classification Search
CPC ................. H04L 63/1441; H04L 67/22; H04L 2463/146
See application file for complete search history.

(56) References Cited

U.S. PATENT DOCUMENTS 7,574,740 B1    8/2009  Kennis
7,813,822 B1 *  10/2010 Hoffberg ............ H04N 21/4318
                                                    381/73.1

(Continued)

FOREIGN PATENT DOCUMENTS

CN    105471882 A    4/2016
EP      2882159 A1    6/2015
KR   20160119678 A   10/2016

OTHER PUBLICATIONS

Abolhasanzadeh Bahareh: "Nonlinear dimensionality reduction for intrusion detection using auto-encoder bottleneck features", 2015 7th Conference on Information and Knowledge Technology (IKT), IEEE, May 26, 2015 (May 26, 2015), pp. 1-5, XP033223655, pp. 1-6.

*Primary Examiner* — Minh Chau Nguyen
(74) *Attorney, Agent, or Firm* — Leydig, Voit & Mayer, Ltd.

(57) ABSTRACT

A method for predicting one or more events includes generating, for features of each of at least two feature types, an intermediate representation using a representation learning model for the at least two feature types. The intermediate representations of the at least two feature types are analyzed using a neural network and at least one neural network model so as to provide a joint representation for predicting certain events. One or more actions to be taken can be determined based on the one or more events predicted by the joint representation.

20 Claims, 6 Drawing Sheets

(56) References Cited

U.S. PATENT DOCUMENTS

| | | | |
|---|---|---|---|
| 9,306,965 B1 | 4/2016 | Grossman et al. | |
| 9,516,053 B1* | 12/2016 | Muddu | G06F 3/04842 |
| 2006/0117386 A1 | 6/2006 | Gupta et al. | |
| 2007/0250461 A1* | 10/2007 | Sabe | G06N 20/00 |
| | | | 706/12 |
| 2014/0157405 A1 | 6/2014 | Joll et al. | |
| 2017/0200265 A1* | 7/2017 | Bhaskar | G03F 1/84 |
| 2017/0286809 A1* | 10/2017 | Pankanti | G06N 3/04 |

* cited by examiner

METHOD FOR PREDICTING EVENTS USING A JOINT REPRESENTATION OF DIFFERENT FEATURE TYPES

STATEMENT REGARDING SPONSORED RESEARCH

The project leading to this application has received funding from the European Union's Horizon 2020 research and innovation programme under grant agreement No 653449.

CROSS-REFERENCE TO PRIOR APPLICATIONS

This application is a U.S. National Stage Application under 35 U.S.C. § 371 of International Application No. PCT/EP2017/081257 filed on Dec. 1, 2017, and claims benefit to European Patent Application No. EP 17156689.6 filed on Feb. 17, 2017. The International Application was published in English on Aug. 23, 2018 as WO 2018/149530 A1 under PCT Article 21(2).

FIELD

The present invention relates to methods and computer systems for predicting events using a joint representation of different features types, and a neural network used in such methods and systems for providing the joint representation.

The present invention also relates to a method for operating a network like a communication network, said network comprising a plurality of computing devices used by one or more users, wherein each computing device having one or more device features and wherein each user using a computing device has one or more user features and initiating one or more requests, each request having one or more request features.

The present invention also relates to an operating entity for operating a network like a communication network, said network comprising a plurality of computing devices used by one or more users, wherein each computing device having one or more device features and wherein each user using a computing device has one or more user features and initiating requests, said requests having request features.

The present invention further relates to a neural network entity for predicting certain events.

The present invention even further relates to a method for operating a neural network entity for predicting certain events.

The present invention even further relates to a non-transitory computer readable medium storing a program causing a computer to execute a method for operating a network like a communication network, said network comprising a plurality of computing devices used by one or more users, wherein each computing device having one or more device features and wherein each user using a computing device has one or more user features and initiating requests, said requests having request features.

The present invention even further relates to a non-transitory computer readable medium storing a program causing a computer to execute a method for operating a neural network entity for predicting certain events.

Although applicable to any kind of network the present invention will be described with regard to communication networks.

Although applicable to any kind of events, the present invention will be described with regard to security events.

BACKGROUND

Communication networks and each of the network devices are nowadays under constant attack. The motivations for these attacks are numerous and range from hacking of personal banking information to the creation of botnets for orchestrated attacks on third-party computing infrastructures. In recent years, the ever growing number of small devices such as sensors, routers, cameras, etc. in the communication network has aggravated the risk of network and device intrusion. Despite this, only a minority of the largest worldwide companies have adequate technical safeguards against cyber risk. Consequently a growing market exists for vendors who can educate and help companies to implement cybersecurity defensive measures, such as setting up firewalls, intrusion prevention and management tools, user roles and policies, and communication and data encryption.

Most conventional intrusion detection and cybersecurity systems are rule-based and need a constant human supervision and constant addition of threat and cybersecurity knowledge leading to a reduced reliability due to the "human factor" with high costs.

Further conventional methods are e.g. disclosed in U.S. Pat. No. 7,574,740 B1 or EP 2 882 159 A1 and use a single source of data. Rules/Heuristic-based systems as e.g. disclosed in US 2014/0157405 require some prior knowledge and also constant human supervision. Further rules/heuristics have to be updated for each new configuration and/or threat detected in the network.

SUMMARY

In an embodiment, the present invention provides a method for predicting one or more events which includes generating, for features of each of at least two feature types, an intermediate representation using a representation learning model for the at least two feature types. The intermediate representations of the at least two feature types are analyzed using a neural network and at least one neural network model so as to provide a joint representation for predicting certain events. One or more actions to be taken can be determined based on the one or more events predicted by the joint representation.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
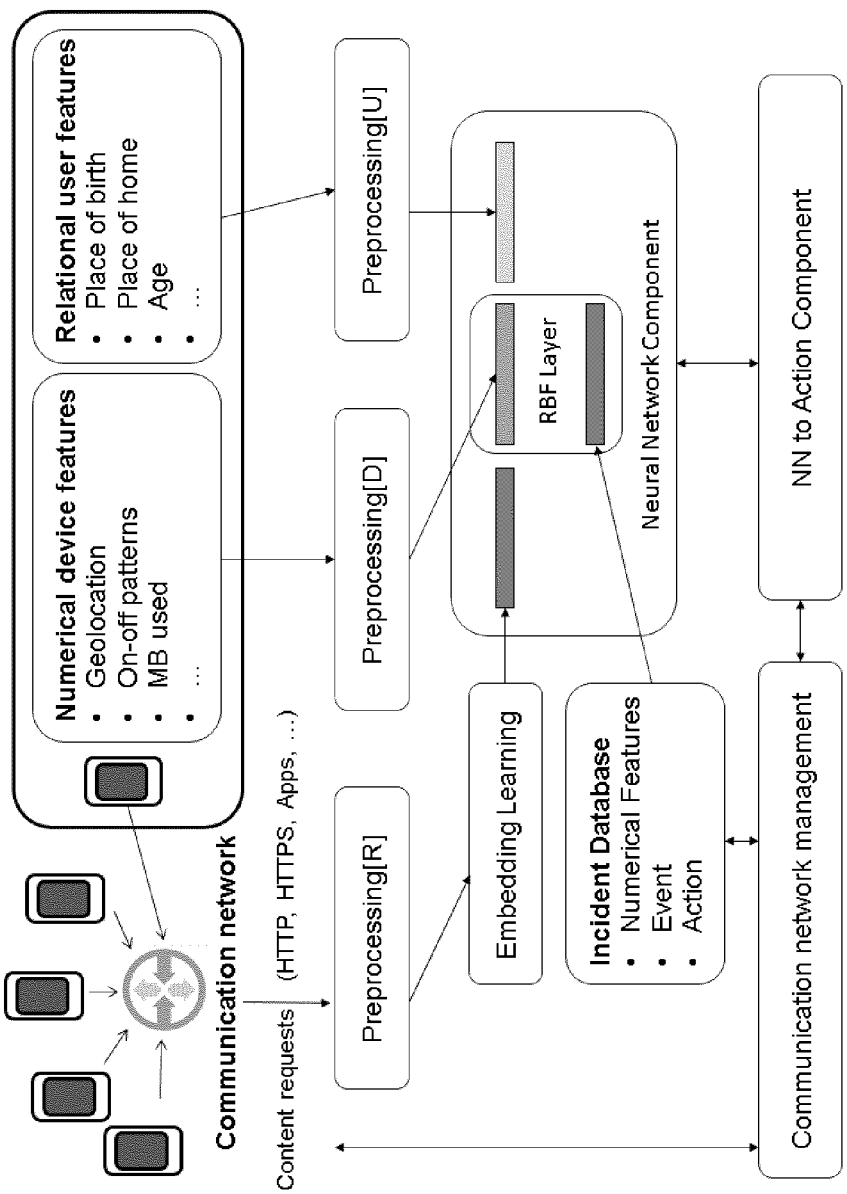
FIG. 1 shows schematically a method and network according to an embodiment of the present invention.

Embodiments of the present invention therefore address the problem of increasing the reliability in predicting events, in particular of security related events like security breaches, threats or the like while reducing the costs for maintaining and updating and supervising entities for detecting security breaches.

In an embodiment the present invention provides a method for operating a network like a communication network, said network comprising a plurality of computing devices used by one or more users, wherein each computing device having one or more device features and wherein each user using a computing device has one or more user features and initiating one or more requests, each request having one or more request features
comprising the steps of
a) Generating by a learning entity for features of each of at least two of said three features an intermediate representation by maintaining and/or updating a representation learning model for said at least two features,
b) Analyzing said intermediate representations of said at least two features by a neural network entity using at least one neural network model to provide a joint representation for predicting certain events, and
c) Deciding by a decision entity to perform, one or more actions for operating said network said actions being computed based on the joint representation.

In other words, an embodiment of the present invention provides a method for operating a network like a communication network. Said network comprises a plurality of computing devices which are used by one or more users. Each computing device is associated or has one or more device features. The same applies correspondingly to users: Each user using a computing device may be associated with or has one or more user features. A user may initiate one or more requests. Each request may be associated with or has one or more request features. The method is performed by the following steps: A learning entity generates—for features of each of at least two of said three features—an intermediate representation by maintaining and/or updating a representation learning model for said at least two features. A neural network entity then analyses said intermediate representations of said at least two features by using at least one neural network model. A result of said analysis is then provided by said neural network entity in form of a joint representation for predicting certain events. A decision entity then decides to perform, one or more actions for operating said network, wherein said actions being computed based on the joint representation.

In a further embodiment the present invention provides an operating entity for operating a network like a communication network, said network comprising
a plurality of computing devices used by one or more users, wherein each computing device having one or more device features and wherein each user using a computing device has one or more user features and initiating requests, said requests having request features
a learning entity adapted to generate for features of
each of at least two of said feature types an intermediate representation by maintaining and/or updating a representation learning model for said at least two feature types,
a neural network entity adapted to analyze said intermediate representations of said at least two feature types by a neural network entity using at least one neural network model and to provide a joint representation for predicting certain events based on said analysis, and
a decision entity adapted to decide to perform one or more actions for operating said network said actions being computed based on predicted events of the joint representation.

In a further embodiment the present invention provides a neural network entity for predicting certain events, comprising an input interface for receiving feature representations,
a processing component entity connected to said input interface adapted to analyze received feature representations for said features by using at least one neural network model and adapted to generate a joint representation for predicting certain events, based on the result of said analysis, and
an output interface adapted to provide said joint representation.

In a further embodiment the present invention provides a method for operating a neural network entity for predicting certain events, comprising the steps of
a) Receiving, by an input interface, representations of request features, device features and/or user features,
b) Analyzing, by a processing component entity of said neural network entity, connected to said input interface, said received representations for said features by using at least one neural network model,
c) Generating, by said processing component entity, a joint representation predicting certain events, based on the result of said analysis of step b), and
d) Providing, by an output interface, said joint representation.

In an even further embodiment the present invention provides a non-transitory computer readable medium storing a program causing a computer to execute a method for operating a network like a communication network, said network comprising a plurality of computing devices used by one or more users, wherein each computing device having one or more features—device features—and wherein each user using a computing device has one or more features—user features—and initiating requests, said requests having features—request features—
comprising the steps of
a) Generating by a learning entity for features of each at least two of said features types an intermediate representation by maintaining and/or updating a representation learning model for said at least two feature types,
b) Analyzing, by a neural network entity, said intermediate representations of said at least two feature types by a neural network entity using at least one neural network model to provide a joint representation for predicting certain events, and
c) Deciding by a decision entity to perform one or more actions for operating said network said actions being computed based on predicted events of the joint representation.

In a further embodiment the present invention provides a non-transitory computer readable medium storing a program causing a computer to execute a method for operating a neural network entity for predicting certain events, comprising the steps of
a) Receiving, by an input interface, representations of request features, device features and/or user features,
b) Analyzing, by a processing component entity of said neural network entity connected to said input interface, said received representations for said features by using at least one neural network model, c) Generating by said processing component entity a joint representation predicting certain events, based on the result of said analysis of step b), and d) Providing, by an output interface, said joint representation.

At least one embodiment of the present invention may have, provide or enable at least one of the following advantages:

enhanced reliability, since human supervision is not necessary anymore or at least can be significantly reduced;

easy implementation, since cybersecurity knowledge and abstract knowledge is "covered" by the neural network component and countermeasures may be provided automatically;

combining different types of features like device features, relational user features and requested sequence features obtaining a more complete "picture" of possible events in the network, for example security related events like threats or the like; and/or improved efficiency and accuracy in particular by using a neural network.

In other words embodiments of the present invention are able to record and extract and—where appropriate—preprocess different kinds of features like numerical, request pattern embedding and relational user data enhancing the performance. A neural network learning a joint representation for different input representations may enable an efficient and effective network architecture and network operation.

The terms "computing device", "computing entity", "component", "unit", "learning entity", "neural network entity", "network management entity", "preprocessing entity", "decision entity", etc. refer each to a device adapted to perform computing and may include but is not limited to a personal computer, a tablet, a mobile phone, a server, or the like and may comprise one or more processors having one or more cores and may be connectable to a memory for storing an application which is adapted to perform corresponding steps of one or more of the embodiments of the present invention. Any application may be software based and/or hardware based installed in the memory on which the processor(s) can work on. The computing devices or computing entities may be adapted in such a way that the corresponding steps to be computed are performed in an optimized way. For instance different steps may be performed in parallel with a single processor on different of its cores. Said devices or entities may each have one or more interfaces to communicate with the environment, e.g. other devices, humans, etc. Examples for an interface include but are not limited to a keyboard, a mouse, a touchscreen, a USB-Port of type A, B or C, an Ethernet Port, a PS/2-Port, a SIM-Card-Port, a Bluetooth-Port or the like.

The term "network" is to be understood in its broadest sense and refers to at least two computing entities comprising interfaces for communication and being connected with each other via a wire-connection and/or a wireless connection for information sending and receiving.

The term "computational resource" is to be understood in its broadest sense and refers to any kind of physical and/or virtual computational or compute resource, resource, device, entity or the like adapted to perform computing and which can be used by applications, services, users, etc. to perform certain functions, services, applications or the like. A computational resource may include but is not limited to computes, networks, memories, storages, etc. For instance a compute resource may be a CPU resource that is part of the servers inside the datacenter. Thus a server can have compute like CPU (or vCPU), Network like Network Interface Card (NIC), Memory like RAM and/or Storage like external/internal HDD(s).

The term "feature" is to be understood in its broadest sense and refers to any kind of information, data or value(s) associated, connected or linked to an entity, a user, other information or data like a request or the like. For instance a numerical feature associated with a device is its geolocation, the number of bytes transferred or the like. For instance a user feature associated with a user is its place of birth, and a request feature is a HTTP-, HTTPS- or the like request or applications issuing the request or the like.

The term "threat" is to be understood in its broadest sense and refers to an incident, situation, scenario, arrangement or the like indicating a problem for a normal operation like an intrusion, etc. being represented by one or more parameters for physical values or variables fulfilling one or more boundaries, thresholds, value ranges or the like. An example for a "threat" is a usage of access data for an account twice with different devices in different locations simultaneously.

The term "event" is to be understood in its broadest sense and refers to any kind of incident, occasion, happening, act or the like. For instance a type of incident is referred to as event. The term "event information" represents information, data, etc. of an event encoded into a machine-readable format. An example of events are malware found on a device, DNS attack, device theft, etc.

The term "representation" is to be understood in its broadest sense and refers to any kind of ordered information, data structure or the like suitable for or enabling processing of said information by a computing entity or device. For example a representation is a vector which entries representing different device or user features by corresponding values. A representation can also be a so-called learned representation in form of a matrix whose entries do not have a 1-to-1 mapping with any observable feature but relate for instance to a statistical combination of observable features.

The term "joint" with regard to "representation" refers to a representation directed to represent, enable or provide combined information such that different features, e.g. necessary or relevant for assessing or predicting events are not processed separately and/or sequentially but can be processed together or can be processed in a combined way.

The term "intermediate" with regard to "representation" refers to a representation directed to represent, enable or provide information such that one feature, e.g. necessary or relevant for assessing or predicting events can be processed such to be combined later with representations of other features.

The term "neural network model" is to be understood in its broadest sense and refers to any kind of procedure, algorithm or the like providing functions of an artificial neural network based on certain assumptions. Neural networks are in particular self-learning and trained, rather than explicitly programmed. Examples include but are not limited to feedforward or recurrent neural networks.

The term "format" is to be understood in its broadest sense and refers to any kind of ordered information, data structure or the like, which may be predefined or standardized, necessary for further processing of the data. For instance, in case device features include a value regarding the amount of bytes transferred in the last month by the device for further processing this information has to be expressed in a standardized manner, e.g. in megabytes or kilobytes.

The term "action" is to be understood in its broadest sense and refers to any kind of act(s), activity(ies), instruction(s), performance(s), execution(s) or the like, for instance concrete high-level or human-understandable steps for countermeasures of security breaches like closing of ports, e.g. "close Port 12345", of interfaces or the like, block certain kinds of data traffic, etc.

The term "operation" is to be understood in its broadest sense and refers to one or more instructions, in particular atomic instructions, commands or the like, which can be executed by respective computing entities in the network. For example, an operation includes but is not limited to low-level assembler code for performing one or more actions.

The term "attribute" with regard to the term "request" is to be understood in its broadest sense and refers specification to any kind of information, data, value(s) or the like associated, linked or connected with a request, e.g. to identify a request or the like. For instance, an attribute may include but is not limited to domain type like ".us", ".com", etc., content type like "video", "audio", "ebook", "text", etc.

The term "request key" is to be understood in its broadest sense and refers to any kind of information, data, value(s), parameters or the like which can be used to identify unique and/or consecutive requests. For instance, a request key may be but is not limited to a concatenation of an IP address, two attributes, separated by commas:
www.xyz.com,text,html.

The term "analyzing" is to be understood in its broadest sense and refers to any evaluation, checking, testing, examining, studying, parsing or the like performed by a device, in particular by a computational device.

Further features, advantages and further embodiments are disclosed or may become apparent in the following:

Device features and/or user features may be preprocessed by a preprocessing entity to provide said features in a predefined format for further processing. This may enable an easy and efficient preparation for further processing of the features.

Request features of requests may be preprocessed to identity unique or consecutive requests. This may enable a fast and efficient identification of unique and consecutive requests.

Said one or more actions may be translated into one or more operations for operating said network. This may enable an easy implementation since easy understandable and configurable rule-action relations can be used for operating the network enabling for example, an implementation in forwarding elements like switches while providing operations for network components for performing said action(s). For instance, an action like "close port xyz upon detecting data traffic from geographical region A" may lead to a series of operations, in particular atomic operations for operating the network like "detecting all incoming data traffic", "check the IP-addresses and ports of said incoming data traffic", "determine the geographical regions of said incoming data traffic", "matching ports and incoming data traffic on said ports with geographical region A", "close matched ports".

Past events and feature representations associated with said past events may be stored in a database being connected to the neural network entity and used to train said neural network entity. This may enhance the precision and flexibility since for example the database storing all incidents and feature representations associated with these incidents is used to train the neural network components to predict the event type from the feature representations. It may also be used to investigate trends and patterns in the incidents and an expert may oversee and edit entries in that database further enhancing the precision.

Said device features may be analyzed only if one or more of values of said device features are within a certain range. This may enable analyzing the device features only when for instance a numerical feature is in a certain range of values: for instance, when the neural network learns that devices are stolen in the crime hotspot more often than in another area computational resources are saved.

Said events may be security events and said provided actions may be actions for countermeasures against the breach of security related to said security events. This may enable efficiently providing countermeasures against security threats for example intrusion into the network or the like.

For preprocessing requests, predefined request attributes provided by a network operator may be used for generating a request key, said request key being used to identify unique requests. This may enable an efficient way to identify consecutive and unique requests.

Consecutive requests with identical request key may be merged into a common single request. This enables an efficient handling of consecutive requests by the neural network.

A request feature of a request may specify a domain type, a content type, a protocol type or the like and/or a device feature of a device may specify a geolocation, a power-consuming pattern, on-off-pattern, data volume sent and/or received, data traffic patterns for sent or received data of said device or the like and/or a user feature of a user may specify the place of birth, an address, preferably a home address, age, current position, height color of hair or eyes, most visited places, most used train stations, or the like. This may enable in an easy way request, user and/or device features.

FIG. 1 shows schematically a method and network according to an embodiment of the present invention.

In FIG. 1 a system architecture of a network for thread detection and network management is shown, which combines several heterogeneous data sources to train a machine learning system that initiates possible network management actions. The system or entity is located in a communication network, which may be run by the network operator, and comprises six components: Preprocessing, Embedding Learning, Neural Network System, NN to Action Component, Incident Database, and Network Management Component. The components and units may be provided on a single computing entity like a personal computer, switch or the like in a virtualized way or on different physical computing entities like a personal computer, switch or the like connected with each other for exchanging computational data like results, etc.

There may be one preprocessing unit, one for each type of data source such as device or user features. In the following three processing units are assumed.

In the following a preprocessing of requests, '[R]', is described:

There are two inputs to this preprocessing component: (a) an operator, e.g. an internet service provider or a company service provider, provides a set of request attributes, which are used to form a request key and (b) the request sequences passing through the communication network. The attributes forming a request key are fixed and are taken from the properties of the types of requests. Which of the attributes form a key may be application dependent and may be decided by the operator of the entity or system. For example, for HTTP requests, a request key could comprise the domain and content type of the HTTP request. A request key value is a particular instantiation of the request key. For the above example, this could for instance be [www.rei.com, text/html].

An example for a HTTP request key may be:
[1425291195, 1425291300, 1035, 202.201.13.20, '28066', text/html, http://m.rei.com, http://www.rei.com/s/mens-jackets-deals?ir=collection%3Amens-jackets-deals&page=1]

The request key is used to identify unique requests. Requests with the same request key may be treated as unique in the Embedding Learning component. Consecutive requests with identical request key values are merged into one single request.

In the following a processing of a device features [D] is described:

A mobile phone, a router and a sensor for instance are referred to as devices in a communication network. Device features may be numerical, i.e. comprise one or more numerical values. Examples are the geolocation of a mobile phone, the on-off patterns of the phone, and data volume of the data traffic used of an existing data plan. It can also be the traffic size patterns leaving a sensor and the particular values of the sensor sent into the network. A processing entity according to an embodiment of the present invention combines this type of information with request patterns and relational features about the device owner in a neural network model. The feature values can be normalized in a standardized manner. For instance, since there are several ways to represent geolocations like ENU or NED coordinates, for example, some form of normalization could be a translation to a standardized format, e.g. one out of the afore-mentioned geocoordinate systems. This is performed in the preprocessing component.

In the following a preprocessing of user features [U] is described:

Every device may be associated with a user. User data is often available to network operators and is stored in a relational database system. Examples of relational user data are the Place of Birth, Age, Home Address and other user related information. This e.g. requires the owner of the device to let the network operator have access to such information. The Preprocessing component generates a sparse encoding out of the demographic data. For instance, having a home address in London is encoded by an individual bit, i.e. a binary encoding that is 1 if the address is in London and 0 otherwise. Every possible age value may be encoded by a separate bit and so on, a so-called one-hot encoding of the user features. The sparse encoding of the user features is combined with the request behavior feature vector learned by the Embedding Model and with the numerical feature vector.

In the following the Embedding Model component is disclosed:

The Embedding Model component maintains and continuously updates a representation, here a vector representation of request sequences in the network. The embedding learning model is used to compute an intermediate representation, here a vector representation (embedding) for each request sequence that originated from a particular user of the network.

Figure 2:
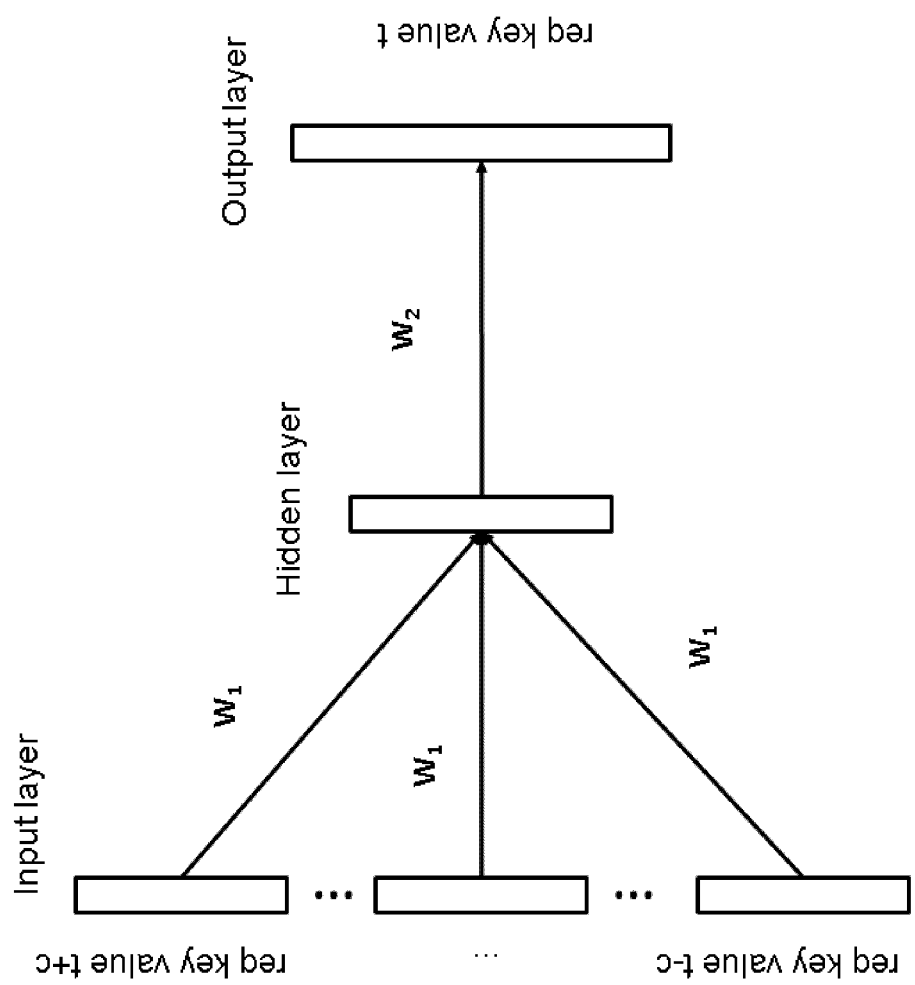
FIG. 2 shows in a schematical form part of a method according to an embodiment of the present invention.

In the Embedding Model component, the request sequences provided by the Preprocessing component are used as contexts of the request key value situated at the end of the sequence. The output of the model, therefore, is the last request key in the request sequence as shown in FIG. 2. As a result, the Embedding Model Component learns representations for each of the request keys so that the context can be predicted from the respective request key value. The embedding model is preferably based on shallow neural networks like a feedforward neural network which may be trained using stochastic gradient descent (SGD) as e.g. disclosed in the non-patent literature of Léon Bottou: Large-Scale Machine Learning with Stochastic Gradient Descent, Proceedings of the 19th International Conference on Computational Statistics (COMPSTAT'2010), 177-187, Edited by Yves Lechevallier and Gilbert Saporta, Paris, France, August 2010, Springer, and backpropagation due to the method's efficiency, which is herein incorporated by reference. An embedding model transforms a sparse vector representation of tokens such as words or integer numbers into a lower dimensional dense vector representation. A token may be hos tname extracted from a HTTP request. At each point in time, the embedding model provides an embedding of the request key values.

This embedding is transferred to the Neural Network Component where it is combined with the Numerical Device Features and the Relational User Features. The step of combining refers here to a mathematical operation that combines two or more vector representations into one vector representation. Examples of such combinations are the concatenation of the vectors, elementwise averaging of the vectors, or taking the elementwise a maximum of the vectors.

The intermediate vector representation for each type of data source is e.g. learned by an independent non-linear function implemented by a feedforward or recurrent neural network from an original input space of the respective data source such as device or user features. For instance, if the features pertaining to the user are numerical features, a feed-forward neural network can be used to learn the intermediate representation of these features. If the input features comprises text data associated with a user of the network, a recurrent neural network in combination with a word embedding network can be used to learn an intermediate representation.

In the following the Incident Database is disclosed:

The incident database stores a history of past incidents such as security breaches, DNS attacks, malware activity, and device theft. The different types of incidences are referred to as events and it is these events that the Neural Network Component is trained to predict. For each of the incidents, in addition to the metadata such as time, device identity and user identity, the three vector representations—also called embeddings—for the different data sources are also stored. Moreover, for each of the events an action is recorded that was performed to mitigate or eliminate the problem associated with the event.

An example is:
[event='malware', Mar. 30, 2016, 12:03:10, req_emb_id, num_emb_id, rel_emb_id, action_id]

The example depicts a typical entry of the incident database. The event field identifies the type of event; in this case the event is a malware on a device. The entry also stores the data and time of the incident and keys into tables that store the embeddings for the request patterns, the numerical device feature values, and the sparse relational feature vector. The action_id field maps into a table that stores the action performed. The above entry is an example and could comprise more or additional information than discussed above.

The main purpose of the Incident Database is to store all incidents and the feature representations associated with these incidents. These incidents are used to train the Neural Network Component to predict the event type from the feature representations. It may also be used to investigate trends and patterns, for example, a high frequency of robberies in a certain area, in the incidents and expert can oversee and edit the entries in the database.

In the following the Neural Network Component is disclosed:

The Neural Network Component maintains the machine learning models, e.g. "traditional" classifiers such as logistic regression or support vector machines that are responsible for predicting events from the three input representations for request patterns, numerical device features, and relational user features. The component maintains a set of neural networks including but not limited to feedforward and recurrent neural networks that have been trained to predict events from the input and are continuously applied to the input for a device whenever activity has been taken place. For instance, whenever a new sequence of HTTP(S) requests in the communication network has been made by the device or whenever a numerical feature of the device has changed. In each of these cases, the several neural network models are applied to the current representations associated with the device. The Neural Network Component returns an output that shows the confidence the model has that a particular event (e.g., malware intrusion) has taken place. The output of the Neural Network Component is passed to the NN to Action Component which might or might not take actions based on the neural networks' output values.

Figure 3:
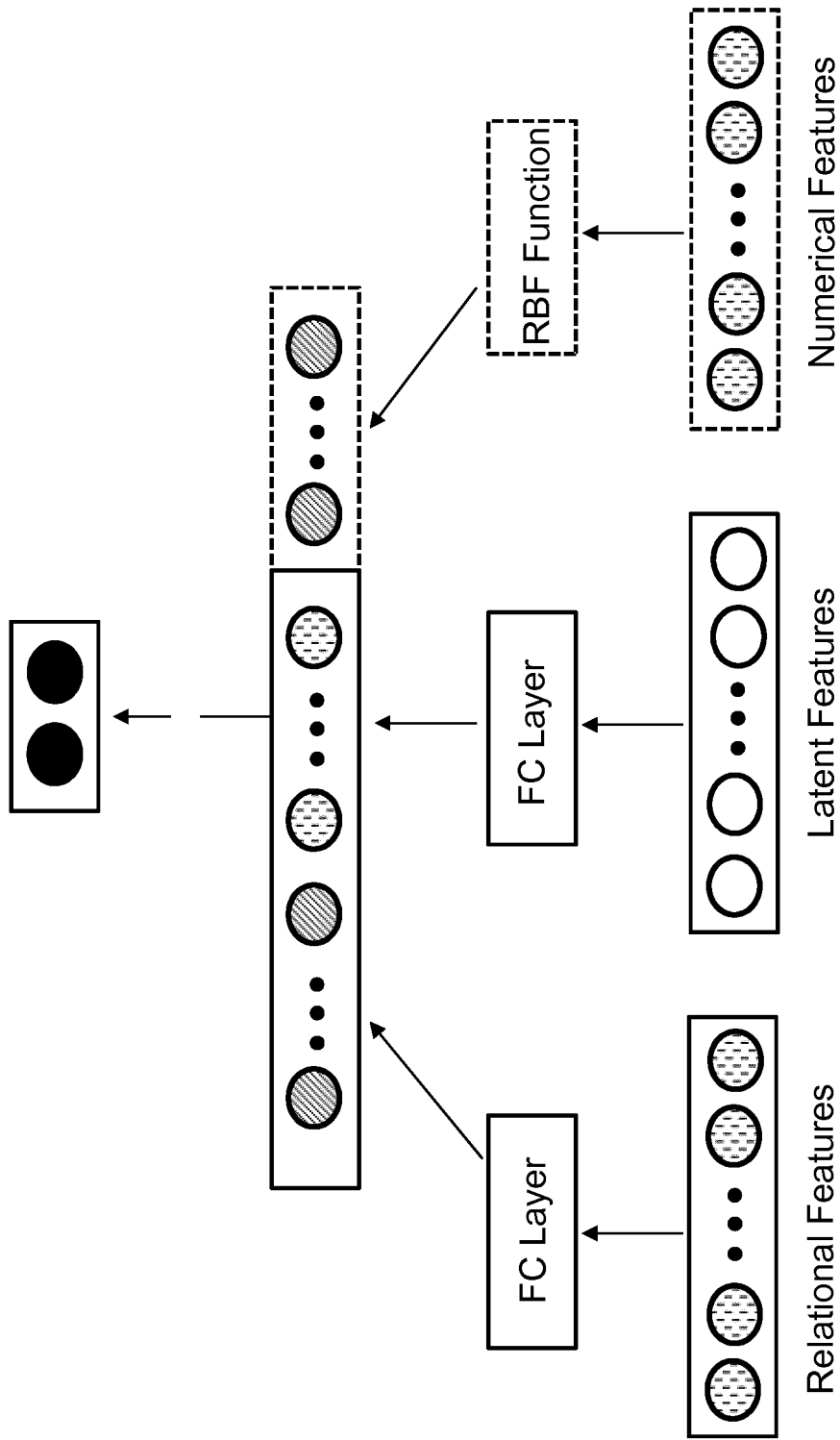
FIG. 3 shows in a schematical form part of the neural network entity according to an embodiment of the present invention.

FIG. 3 depicts a neural network architecture according to an embodiment of the present invention used for the fusion of the three input representations. Every box represents a single layer in a neural network. Arrows indicate weighted connections between the layers. Here, the following input vectors are used: Relational Features is a sparse representation of the relational user features. Latent Features is an embedding corresponding to the request behavior of the device. Numerical Features are the numerical device features.

The numerical features are fed into a layer—denoted RBF—Radial Basis Function—in FIG. 1—that computes a function of the feature values and standardized feature values. A radial basis function RBF is e.g. a real-valued function whose value depends only on the distance from the origin, e.g. $\exp(-r^2)$ or the like.

These standardized feature values are mean and standard deviation computed based on the entries in the Incident Database. This function is provided such, that it gets activated only when the numerical feature is in a certain range of values. This is desired in a cybersecurity scenario: for example, the model can learn that devices are stolen in crime hotspots defined in a range of latitude and longitude geo-coordinates more often than in other areas. Other networks are not suitable, since they get triggered from a threshold on, preventing the model from limiting the activation only when the input is in a certain range/s of values. The neural network is continuously trained on the data in the Incident Database. It comprises intermediate layers that result in a sparse intermediate representation of the three input representations. For instance when designing the networks, the values of these intermediate representations can be confined in the interval [0,1].

These values may be interpreted as the veracity of some basic rules learned by the model. These three intermediate representations are then concatenated and, by additional neural network layers on top, fused into a joint model. These layers can learn arbitrary complex rules by combining the basic learned rules from the concatenated intermediate representations. FIG. 3 depicts this workflow. Because of the nature of these intermediate representations, the joint model is able to explain the reasons, e.g. feature values have led to activate which rules, a prediction has been made. Hence, the joint model predicts the event likelihoods based on a combined representation, which is computed by a learned neural network. Neural networks, in particular feedforward neural networks, are especially suitable to combine different representations into a joint representation. Moreover, neural networks are highly efficient in making predictions and are, therefore, suitable for real-time in-network processing.

For instance, the following representations provided by a device at a given point of time are assumed:
  Request features indicating that the user is trying to access insistently to his personal banking information.
  Relational user features that indicate that the user is a home-lover person, and that it is a weekday.
  Numerical features pointing out that the device is located in area known as a crime hotspot, and the time is the early morning.

This information, which is exclusive of each type of features and cannot be extracted from other type, helps the model for the event 'device-stolen' to output a high probability that such event has happened.

In the following the Neural Network (NN) to Action Component is described:

The Neural Network to Action component receives the outputs of the Neural Network Component and makes decisions based on these outputs. The component stores a set of rules for each of the event types in the Incident Database. Based on the rule it is determined whether an action should be taken and also which actions should be taken. For instance, for the event of a malware intrusion on a mobile device, an email might be sent to the user to inform her of the problem. For the event of a stolen phone, the phone's plan might be suspended and the phones geo-locations recorded so as to track the phone. If the decision is made to trigger an action, the action is passed to the Network Management Component which translates the action into a sequence of operations and executes these operations. An example for a rule is given below:

[neural_network_id='malware', action_threshold=0.9, action='inform-owner-by-email']

The above rule applies a threshold to the output of the neural network that has been trained to predict malware events. If the threshold of 0.9 is exceeded by the output, the action to inform the owner of the mobile device is triggered. The action is then sent to the Network Management Component which translates the action into a sequence of operations that are performed in the network.

[neural network id='device-stolen', action threshold=0.7, action='inform-and-temporal-block-ips']

This is another example in the cybersecurity scenario applied to the case for which a neural network has been trained to predict that the device has been stolen. In such case, the action component decides that the owner of the device has to be informed by email, and immediately to block the access to some IPs (for example, the ones to access the personal email or the banking information of the owner) from the IP associated to that device.

The user can manually set the actions to carry out for each event or leave the default setting.

Finally the Network Management Component is described:

The Network Management Component receives the input from the Neural Network to Action Component. This input is in form of an action identifier for a particular device. The action is mapped to a sequence of operations performed by the component. For instance, the action identifier 'malware" might trigger an email server to send an automated e-mail to the user of the particular device and a firewall to block requests from that particular device (MAC address). If the action is 'stolen phone' the triggered operations might involve a suspension of the associated account and/or a recording of the GPS coordinates of the phone. The component also enables experts to verify whether a cybersecurity event has occurred. In that case the corresponding information is added to the Incident Database.

Figure 4:
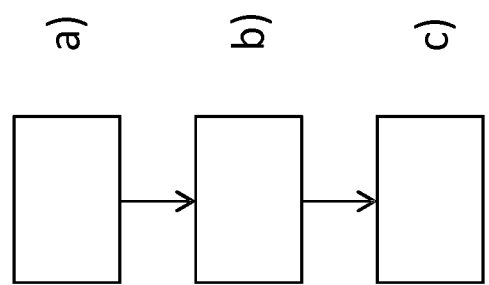
FIG. 4 shows a flow diagram of steps of a method according to an embodiment of the present invention.

FIG. 4 shows a flow diagram of a method according to an embodiment of the present invention.

In FIG. 4 steps of a method for operating a network like a communication network are shown, said network comprising a plurality of computing devices used by one or more users, wherein each computing device having one or more device features and wherein each user using a computing device has one or more user features and initiating one or more requests, each request having one or more request features, comprising the steps of a) Generating by a learning entity for features of each of at least two of said three features an intermediate representation by maintaining and/or updating a representation learning model for said at least two features,
b) Analyzing said intermediate representations of said at least two features by a neural network entity using at least one neural network model to provide a joint representation for predicting certain events, and
c) Deciding by a decision entity to perform, one or more actions for operating said network said actions being computed based on the joint representation.

Figure 5:
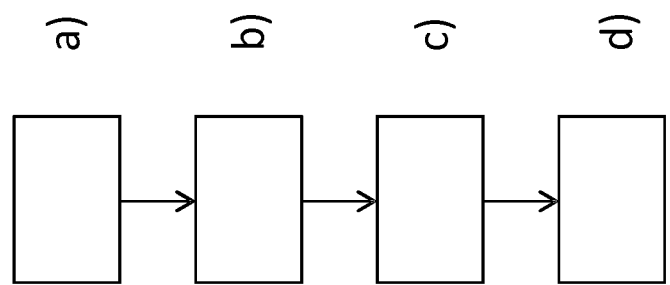
FIG. 5 shows a flow diagram of steps of a method according to an embodiment of the present invention.

FIG. 5 shows a flow diagram of a method according to an embodiment of the present invention.

In FIG. 5 steps of a method for operating a neural network entity for predicting certain events are shown, comprising the steps of a) Receiving, by an input interface, representations of request features, device features and/or user features,
b) Analyzing, by a processing component entity of said neural network entity connected to said input interface, said received representations for said features by using at least one neural network model,
c) Generating by said processing component entity a joint representation predicting certain events, based on the result of said analysis of step b), and
d) Providing, by an output interface, said joint representation.

Figure 6:
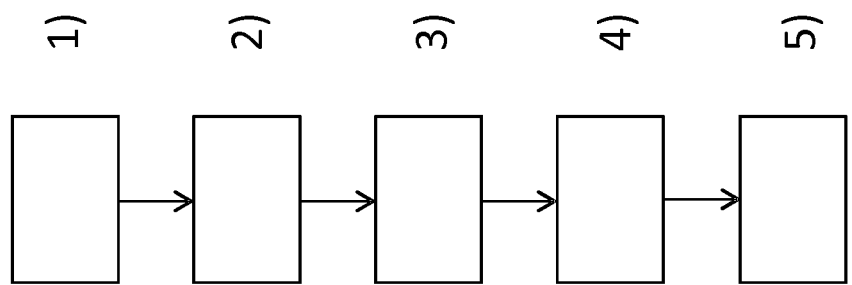
FIG. 6 shows a flow diagram of steps of a method according to an embodiment of the present invention.

FIG. 6 shows a flow diagram of a method according to an embodiment of the present invention.

In FIG. 6 a method is shown comprising the steps of

1) Preprocessing and combining the different types of features like numerical device features, relational user features, and request sequence features;
2) Learning of the embeddings for the request sequence features;
3) Fusion of the different feature types in a e.g. multi-layered (deep) neural network, Neural network Component, that learns intermediate representations for the different features types and finally combines these intermediate representations into a joint representation;
4) A component that translates the output of the Neural Network component into a set of actions;
5) A component that translates the actions into a sequence of operations in the network management system.

In summary at least one embodiment of the present invention enables or provides

1) Components that record, extract, and preprocess the different feature types, e.g. numerical, request pattern embedding, and relational user data, with complementarity of the information that they encode, leading to a superior performance.
2) A neural network that learns joint representation for different input vector representations, e.g. three different representations. Embodiments enable efficiency and effectiveness, in particular in a cybersecurity scenario. For instance, when assuming an activation function to execute when the numerical feature's values are in a specific range. By way of example, the model can learn that in some geographical areas, e.g. defined in a range of latitudes and longitudes, some types of events happen more often than in others.
3) Components that maintain heuristics that map the outputs of the neural network component to actions taken in the network At least one embodiment of the present invention may have, provide or enable at least one of the following:
High efficiency,
higher precision,
cost reduction,
high flexibility, and
increased reliability.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for predicting one or more events, the method comprising:
   a) generating, for features of each of at least two different feature types, an intermediate representation using a representation learning model for the at least two different feature types;
   b) analyzing the intermediate representations of the at least two different feature types using a neural network and at least one neural network model so as to provide a joint representation for predicting certain events, wherein the joint representation combines the intermediate representations; and
   c) determining one or more actions to be taken based on the one or more events predicted by the joint representation.

2. The method according to claim 1, wherein the one or more actions are for operating a network and the one or more actions are translated into one or more operations for operating the network.

3. The method according to claim 2, wherein said the one or more events are security events and said the one or more operations are operations for countermeasures against a breach of security related to the security events.

4. The method according to claim 2, wherein the network comprises a plurality of computing devices used by at least two users, wherein the features of the at least two different feature types include one or more device features of the computing devices, one or more user features of each of the at least two users and one or more request features of requests initiated by the users, and wherein the network is a communications network and the one or more events predicted by the joint representation are security events.

5. The method according to claim 1, wherein predefined request attributes are used for generating a request key, the request key being used for preprocessing of requests to identify unique requests.

6. The method according to claim 5, wherein consecutive ones of the requests having a same request key are merged into a common single request.

7. The method according to claim 1, wherein the at least two different feature types include device features and user features, and wherein the device features and/or the user features are preprocessed to provide the features in a predefined format for further processing.

8. The method according to claim 1, wherein request features of requests are preprocessed to identify unique or consecutive requests.

9. The method according to claim 1, wherein past events and representations of features associated with the past events are stored in a database connected to the neural network and used to train the neural network.

10. The method according to claim 1, wherein the at least two different feature types include device features and user features, and wherein the device features are analyzed only if one or more of values of the devices features are within a predetermined range.

11. The method according to claim 1, wherein:
   a request feature of a request specifies a domain type, a content type, a protocol type or the like;
   a device feature of a device specifies a geolocation, a power-consuming pattern, on-off-pattern, data volume sent and/or received, data traffic patterns for sent or received data of the device or the like; and/or
   a user feature of a user specifies place of birth, an address, age, current position, height, color of hair or eyes, most visited places, most used train stations or the like.

12. A tangible, non-transitory computer readable medium having instructions thereon which, upon execution by one or more processors, alone or in combination, provide for execution of the method according to claim 1.

13. The method according to claim 1, wherein the neural network for learning the joint representation is a feedforward neural network.

14. The method according to claim 1, wherein the intermediate representations are vector representations, and wherein the joint representation combines the vector representations in a joint embedding space.

15. The method according to claim 1, wherein the representation learning model is an independent non-linear function implemented by either a feedforward neural network or a recurrent neural network.

16. The method according to claim 1, wherein each of the intermediate representations is generated using a corresponding representation learning model, and each of the corresponding representation learning models processes a different feature type of the at least two different feature types.

17. A neural network entity for predicting certain events, comprising:
   an input interface configured to receive intermediate representations for features of each of at least two different feature types which were learned using a representation learning model for the at least two different feature types;
   a processing component comprising one or more hardware processors connected to the input interface and configured to analyze the intermediate representations for the features by using at least one neural network model to generate a joint representation for predicting the certain events, based on a result of the analysis; and
   an output interface configured to provide the joint representation for use in predicting an existence or occurrence of at least one of the certain events,
   wherein the joint representation combines the intermediate representations.

18. The neural network entity according to claim 17, wherein the neural network entity connects to a communication network comprising a plurality of computing devices used by at least two users, wherein the features of the at least two different feature types include one or more user features of each of the at least two users and one or more request features of requests initiated by the users with one of the plurality of computing devices.

19. A method for operating a neural network entity for predicting certain events, the method comprising:
   a) receiving, by an input interface, intermediate representations for features of each of at least two different feature types which were learned using a representation learning model for the at least two different feature types;
   b) analyzing, by a processing component of the neural network entity connected to the input interface, the intermediate representations for the features using at least one neural network model;
   c) generating, by the processing component, a joint representation that combines the intermediate representations for predicting the certain events, based on the result of the analysis of step b); and
   d) providing, by an output interface, the joint representation for use in predicting an existence or occurrence of at least one of the certain events.

20. A tangible, non-transitory computer readable medium having instructions thereon which, upon execution by one or more processors, alone or in combination, provide for execution of the method according to claim 19.

* * * * *